R. MALCOM.
GOGGLES.
APPLICATION FILED MAR. 5, 1919.
1,369,040.
Patented Feb. 22, 1921.
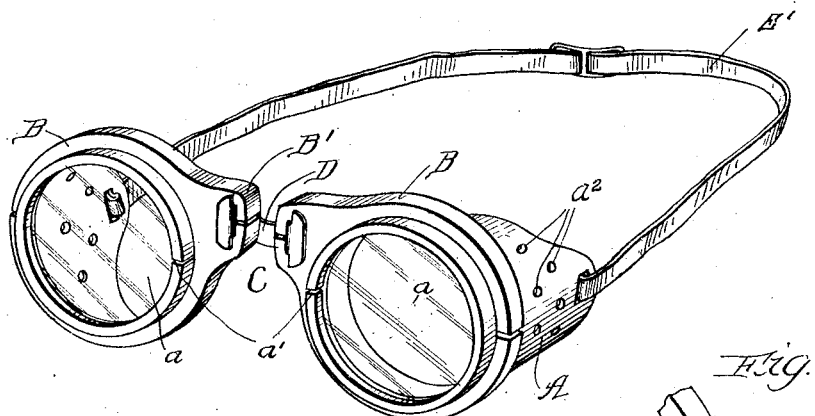
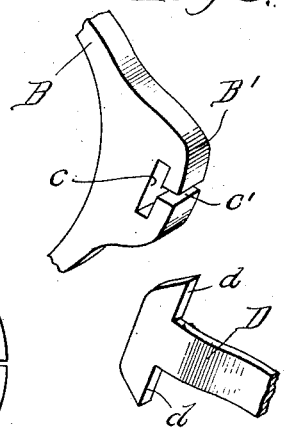
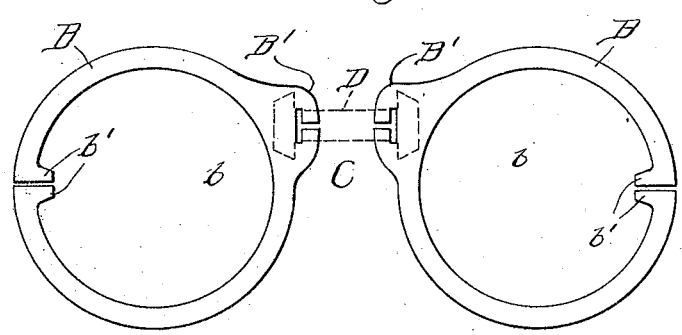
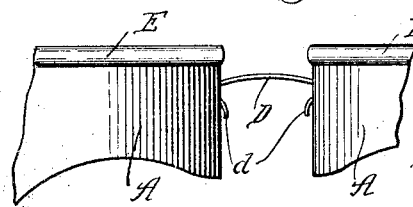
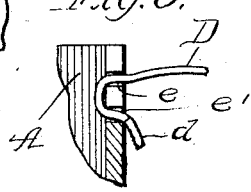
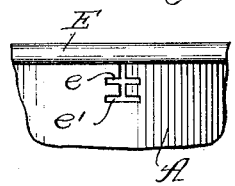
Inventor,
Robert Malcom.
Witness:

UNITED STATES PATENT OFFICE.

ROBERT MALCOM, OF CHICAGO, ILLINOIS.

GOGGLES.

1,369,040. Specification of Letters Patent. Patented Feb. 22, 1921.

Application filed March 5, 1919. Serial No. 280,701.

*To all whom it may concern:*

Be it known that I, ROBERT MALCOM, a citizen of the United States, residing at Chicago, Cook county, State of Illinois, have invented certain new and useful Improvements in Goggles, of which the following, taken in connection with the drawings, is a description.

My invention has for its object the production of an adjustable nose piece for goggles, designed to be used by workmen and others who are exposed to dust, cinders, etc., when for sanitary reasons it is desired to change the same at frequent intervals.

A further object of my invention is to produce a nose piece of this class whereby the user may easily change the same without the use of tools of any kind.

Further objects of my invention will be apparent to those skilled in the art.

In the accompanying drawings I have illustrated what I now consider the preferred form of my invention, although it is obvious certain changes may be made in the device which come within the scope of the claim, without departing from the spirit thereof, and in the drawings, Figure 1 is a perspective view of a pair of goggles with my device embodied therein;

Fig. 2 is a front elevation of the frames detached from the goggles showing the relative position of the parts.

Fig. 3 is an enlarged fragmentary detail showing the slot through which the nose piece is attached and one end of the nose piece to be fitted therein.

Fig. 4 illustrates the nose piece attached direct to the lens holding frames.

Fig. 5 is a side view of a portion of a lens holding frame illustrating the slot formed in the side of said frame for connecting the nose piece; and Fig. 6 is an enlarged fragmentary sectional detail illustrating the manner of applying the nose piece to the form of construction shown in Figs. 4 and 5.

Referring to the drawings, A represents a lens holding frame or ring, which may be preferably formed of fiber, rubber or the like, and which in this instance is split on the inner edge thereof $a'$, thus enabling the ring to be spread sufficiently to insert a lens or glass $a$ into a circumferential groove formed in the ring A within which the lens is seated. Openings $a^2$ are provided through the frames or rings A to afford means for ventilation.

Retaining frames B, provided with openings $b$, extend around this lens holding frame or ring A.

These retaining frames B are also split rings, and are provided with inwardly extending projections $b'$, which are adapted to engage in an opening formed in the outer edge of the lens holding frame or ring A. This engagement serves the double purpose of closing the split ring A, inclosing the lens $a$, and also supports the retaining frame upon said ring, as shown more clearly in Fig. 1.

Each of these retaining frames is provided with outwardly extending projections B′ adapted to form a recess C for the nose.

The projecting portions B′ are each provided with a slot $c$, which has an opening $c'$ extending at right angles thereto to the edge of the frame for the purposes hereinafter explained.

A connecting member D is formed of flexible material such as rubber, leather or the like. This connecting member is, generally speaking, I-shaped; that is, it has an elongated central portion provided with a head at each end, extending at right angles thereto and which is adapted to engage in the slots $c$ and hold the same in place. This connecting member forms a nose bridge and joins the two lenses together.

It will be observed that by inserting the shank D of the connecting member through the slots $c'$ into the transversely extending slot $c$, the outwardly extending sides of the head $d$ prevents the connecting member from slipping through the slot and becoming disengaged.

In Figs. 4, 5 and 6 I have shown the application of this nose piece directly attached to the lens holding frames, in this instance there being a double slot $e$, $e'$ through which the connecting member D is passed as shown more clearly in Fig. 6.

In this construction I prefer to use a metal retaining ring E, which may be screw threaded or otherwise attached to the lens holding frame.

An elastic headband E′ is removably secured to the outer edges of the lens holding frames by means of which the device is held upon the head of the wearer.

It will be obvious that to remove the nose piece from the frame it is only necessary to turn the strip D edgewise and draw it through the open slot, and a new connecting member may be inserted by the reverse movement, thereby permitting said nose piece to be removed and replaced whenever necessary.

I claim:

A pair of goggles comprising eye cups, split rings inclosing said eye cups, said split rings having an extending portion forming a recess for the nose of the wearer, each of said extending portions having slots therein and an opening extending from each of said slots to the edge of the portion, and a flexible nose piece having transversely extending projections upon the ends thereof formed integrally therewith and of larger dimension than the aforesaid slots, opposite ends of said flexible nose piece engaging through said slots to form a nose bridge for the goggles.

In testimony whereof, I have signed this specification in the presence of two subscribing witnesses.

ROBERT MALCOM.

Witnesses:
ARTHUR B. RUSSELL,
VIVIAN REESER.